US012767075B2

(12) United States Patent
Kominato et al.

(10) Patent No.: US 12,767,075 B2
(45) Date of Patent: Oct. 20, 2026

(54) POWER SUPPLY APPARATUS

(71) Applicant: Yazaki Corporation, Tokyo (JP)

(72) Inventors: Yasuhiro Kominato, Makinohara (JP); Sadaharu Okuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 19/208,862

(22) Filed: May 15, 2025

(65) Prior Publication Data

US 2025/0388184 A1 Dec. 25, 2025

(30) Foreign Application Priority Data

Jun. 20, 2024 (JP) ................................ 2024-099400

(51) Int. Cl.
*B60R 16/033* (2006.01)
*B60L 50/60* (2019.01)
*H02M 1/36* (2007.01)

(52) U.S. Cl.
CPC ............ *B60R 16/033* (2013.01); *B60L 50/60* (2019.02); *H02M 1/36* (2013.01); *B60L 2210/12* (2013.01)

(58) Field of Classification Search
CPC ........ B60L 1/00; B60L 2210/12; B60L 50/60; B60L 58/20; B60R 16/033; H02M 1/36
See application file for complete search history.

(56) References Cited

U.S. PATENT DOCUMENTS

2018/0205341 A1* 7/2018 Syed ......................... B60L 1/00
2018/0208064 A1* 7/2018 Wortberg .............. B60L 3/0092
2019/0359079 A1* 11/2019 Mitsutani .................. B60L 1/00
2026/0081448 A1* 3/2026 Wang ................... H02H 7/1213

FOREIGN PATENT DOCUMENTS

CN 114928238 B * 12/2025 .............. H02J 7/855
CN 121172905 A * 12/2025 ............ H01M 10/42
CN 121816679 A * 4/2026 ................ H02J 7/00
CN 224138764 U * 4/2026
EP 3067240 A1 * 9/2016 ............. B60L 50/40
EP 4697547 A1 * 2/2026 .............. H02J 7/855
EP 4703188 A1 * 3/2026 ............. B60L 58/20
JP 2020124060 A * 8/2020
WO WO-2024245089 A1 * 12/2024 ................ B60L 1/00

* cited by examiner

*Primary Examiner* — Babar Sarwar
(74) *Attorney, Agent, or Firm* — Sughrue Mion, PLLC

(57) ABSTRACT

A power supply apparatus includes: a battery configured to supply a power to a first power supply line; a first power converter configured to convert an output power from the battery into a power with a first voltage value and to supply the power with the first voltage value to a second power supply line; a second power converter configured to convert an output power from the battery into a power with the first voltage value and to supply the power with the first voltage value to the second power supply line; and a controller configured to: control the first power converter to be on and control the second power converter to be off during a first period; and control the first power converter to be off and control the second power converter to be on during another period.

10 Claims, 5 Drawing Sheets

POWER SUPPLY APPARATUS

BACKGROUND OF THE INVENTION

Technical Field

The present invention relates to a power supply apparatus.

Background Art

Conventionally, a vehicle includes a low-voltage battery installed therein that outputs a low-voltage power in order to supply a low-voltage power e.g. to an ECU for control electrical components of the vehicle. In addition to the low-voltage battery, electric vehicles (BEV (Battery Electric Vehicle)) and hybrid vehicles (HEV (Hybrid Electric Vehicle), PHEVs (Plug-in Hybrid Electric Vehicle)) include a high-voltage battery installed therein that outputs a high-voltage power to supply a high-voltage power e.g. to a motor for driving the vehicle (see e.g. Patent Document 1).

CITATION LIST

Patent Literature

Patent Document 1: JP 2020-124060 A

SUMMARY OF THE INVENTION

In electric vehicles, costs and/or a weight of the vehicle is increased due to a low-voltage battery installed in addition to a high-voltage battery. Moreover, lead-acid batteries used as low-voltage batteries have a lifetime of about three years. This is also one of reasons why installing a low-voltage battery in an electric vehicle results in increased costs.

An objective of the present invention is to enable two types of loads having different driving voltages to be driven.

In order to achieve this objective, a power supply apparatus according to embodiments of the present invention includes: a battery configured to supply a power to a first power supply line; a first power converter configured to convert an output power from the battery into a power with a first voltage value and to supply the power with the first voltage value to a second power supply line; a second power converter configured to convert an output power from the battery into a power with the first voltage value and to supply the power with the first voltage value to the second power supply line; and a controller configured to control the first power converter and the second power converter, wherein the controller configured to: control the first power converter to be on and control the second power converter to be off during a first period; and control the first power converter to be off and control the second power converter to be on during a period other than the first period.

The present invention enables two types of loads having different driving voltages to be driven.

DETAILED DESCRIPTION OF THE PREFERRED EMBODIMENTS

Power Supply Apparatus 100

Figure 1:
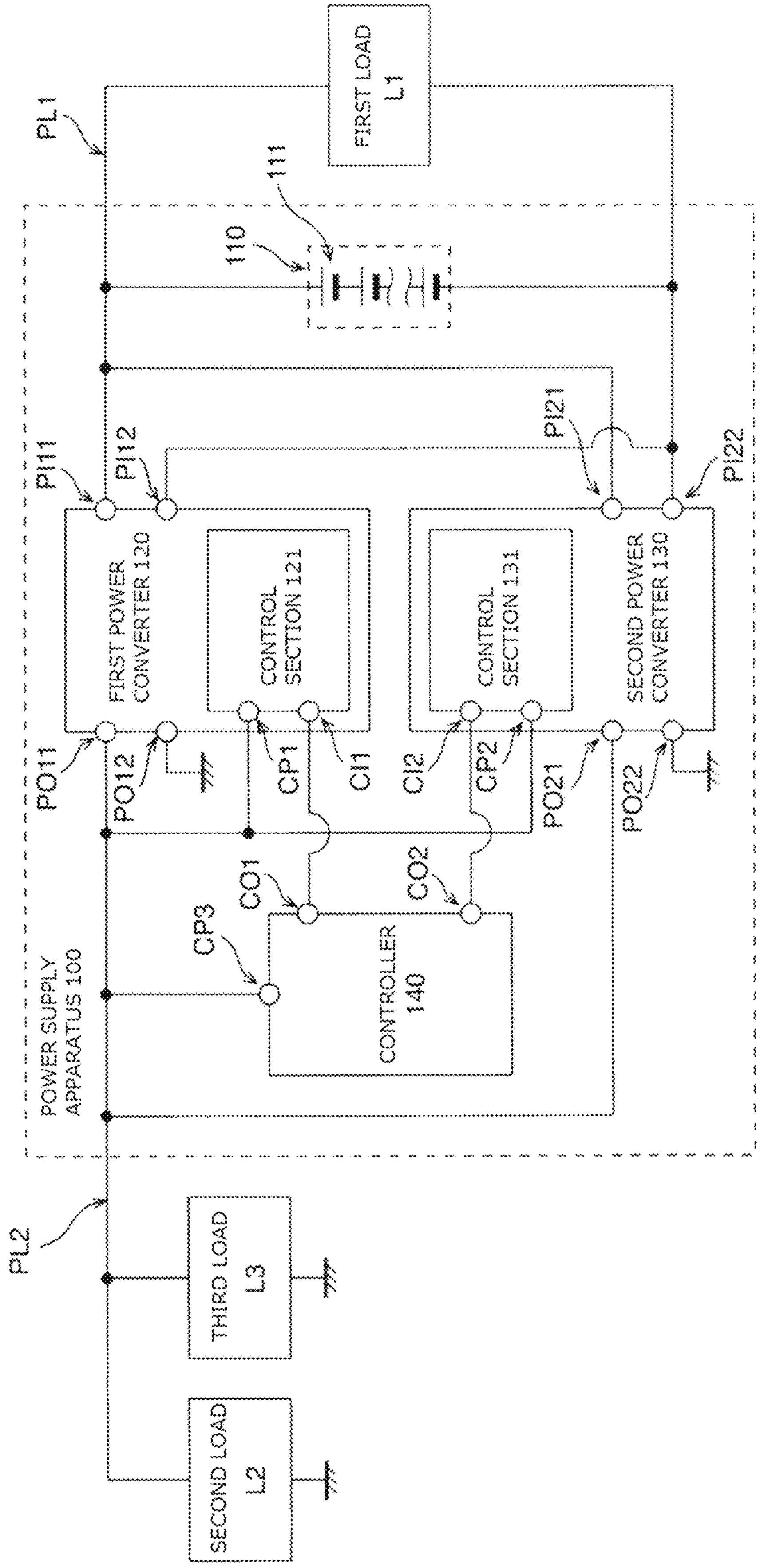
FIG. 1 shows a power supply apparatus 100 according to an embodiment of the present invention.

FIG. 1 shows a power supply apparatus 100 according to an embodiment of the present invention. The power supply apparatus 100 includes a battery 110, a first power converter 120, a second power converter 130, and a controller 140. The power supply apparatus 100 supplies a power to a first load L1 via a first power supply line PL1, wherein the first load L1 is configured to be driven with an output voltage value VB of the battery 110 (for example a voltage higher than or equal to 200 V). The power supply apparatus 100 further supplies a power to a second load L2 and a third load L3 via a second power supply line PL2, wherein the second load L2 is configured to be driven with a voltage value lower than the output voltage value VB of the battery 110 (for example 12V).

The battery 110 supplies a power with the output voltage value VB of the battery to the first power supply line PL1. The battery 110 is formed e.g. by a plurality of cells 111 connected in series, for example a lithium-ion battery. A first load L1 is connected to the first power supply line PL1, wherein the first load L1 is configured to be driven with an output voltage VB of the battery 110, wherein an output power from the battery 110 is supplied to the first load L1 via the first power supply line PL1. Although FIG. 1 shows one first load L1, two or more first loads L1 may be provided.

The first power converter 120 converts the output power from the battery 110 into a power with a first voltage value V1 (for example 12V) and supplies the power with the first voltage value V1 to the second power supply line PL2. This means that the first power converter 120 converts the output voltage value VB of the output power from the battery 110 to the first voltage value V1 and then supplies the converted output power to the second power supply line PL2.

For example, the first power converter 120 is configured as a DC/DC converter (e.g. isolated DC/DC converter) and includes a first power input terminal PI11, a second power input terminal PI12, a first power output terminal PO11, and a second power output terminal PO12. The first power input terminal PI11 is connected to a positive electrode of the battery 110, and the second power input terminal PI12 is connected to a negative electrode of the battery 110. As an input, the first power converter 120 receives the power with the output voltage value VB from the battery 110 through the first power input terminal PI11 and the second power input terminal PI12. The first power converter 120 outputs the power with the first voltage value V1 through the first power output terminal PO11 and the second power output terminal PO12. In the example as shown in FIG. 1, the first power output terminal PO11 is connected to the second power supply line PL2, and the second power output terminal PO12 is grounded. The power output from the first power converter 120 is then supplied to loads connected to the second power supply line PL2.

The first power converter 120 includes a control section 121 configured to control operation of the first power converter 120. For example, the control section 121 is formed by a computer. The control section 121 includes a control signal input terminal CI1 and is configured to control the first power converter 120 to be on/off based on a signal received by this control signal input terminal CI1. This means that the control section 121 of the first power converter 120 switches a state of the first power converter 120 between two states based on the signal received by this control signal input terminal CI1, wherein in one of the two states, the first power converter 120 supplies a power to the second power supply line PL2 (on-state) and in the other of the two states, the first power converter 120 does not supply a power to the second power supply line PL2 (off-state).

The second power converter 130 converts the output power from the battery 110 into the power with the first voltage value V1 and supplies the power with the first voltage value V1 to the second power supply line PL2. This means that the second power converter 130 converts the output voltage value VB of the output power from the battery 110 to the first voltage value V1 and then supplies the converted output power to the second power supply line PL2.

For example, the second power converter 130 is configured as a DC/DC converter (e.g. isolated DC/DC converter) and includes a first power input terminal PI21, a second power input terminal PI22, a first power output terminal PO21, and a second power output terminal PO22. The first power input terminal PI21 is connected to the positive electrode of the battery 110, and the second power input terminal PI22 is connected to the negative electrode of the battery 110. As an input, the second power converter 130 receives the power with the output voltage value VB from the battery 110 through the first power input terminal PI21 and the second power input terminal PI22. The second power converter 130 outputs the power with the first voltage value V1 through the first power output terminal PO21 and the second power output terminal PO22. In the example as shown in FIG. 1, the first power output terminal PO21 is connected to the second power supply line PL2, and the second power output terminal PO22 is grounded. The power output from the second power converter 130 is then supplied to loads connected to the second power supply line PL2.

The second power converter 130 includes a control section 131 configured to control operation of the second power converter 130. For example, the control section 131 is formed by a computer. The control section 131 includes a control signal input terminal CI2 and is configured to control the second power converter 130 to be on/off based on a signal received by this control signal input terminal CI2. This means that the control section 131 of the second power converter 130 switches a state of the second power converter 130 between two states based on the signal received by this control signal input terminal CI2, wherein in one of the two states, the second power converter 130 supplies a power to the second power supply line PL2 (on-state) and in the other of the two states, the second power converter 130 does not supply a power to the second power supply line PL2 (off-state).

The controller 140 controls the first power converter 120 and the second power converter 130 to be on/off. The controller 140 includes a first control signal output terminal CO1 and a second control signal output terminal CO2, wherein the first control signal output terminal CO1 is connected to the control signal input terminal CI1 of the control section 121 of the first power converter 120 and the second control signal output terminal CO2 is connected to the control signal input terminal CI2 of the control section 131 of the second power converter 130. The controller 140 outputs a control signal through the first control signal output terminal CO1 to provide it to the control signal input terminal CI1 of the control section 121 of the first power converter 120 in order to control the first power converter 120 to be on/off. The controller 140 outputs a control signal through the second control signal output terminal CO2 to provide it to the control signal input terminal CI2 of the control section 131 of the second power converter 130 in order to control the second power converter 130 to be on/off.

In the present embodiment, the second load L2 and the third load L3 are connected to the second power supply line PL2, wherein the power with the first voltage value V1 is intended to be supplied to the second power supply line PL2. The first voltage value V1 is capable of serving for driving the second load L2 and the third load L3. The output voltage value VB from the battery 110 is not capable of serving for driving the second load L2 and/or the third load L3, and is for example greater than the first voltage value V1, greater than a voltage value which is capable of serving for driving the second load L2 and/or the third load L3. The second load L2 is configured to be caused to be on during the first period and to be caused to be off during a period other than the first period (second period), wherein the third load L3 is configured to be caused to be always on. Although FIG. 1 shows one second load L2 and one third load L3, two or more second loads L2 and/or two or more third loads L3 may be provided.

Namely, during the first period according to the present embodiment, the power supplied to the second power supply line PL2 is consumed by both the second load L2 and the third load L3, while during the second period, the power supplied to the second power supply line PL2 is not consumed by the second load L2, but by the third load L3. Therefore, the power consumption during the second period according to the present embodiment is lower as compared to the power consumption during the first period.

According to the present embodiment, the second power converter 130 is therefore configured as a power converter that can output a power having a power value, wherein the power value is smaller than a power value of a power which can be output by the first power converter 120. The controller 140 is configured to control the first power converter 120 to be on and control the second power converter 130 to be off during the first period: and control the first power converter 120 to be off and control the second power converter 130 to be on during the second period (period other than the first period). This means that according to the present embodiment, both the second load L2 and the third load L3 are in an on-state during the first period, during which the power of the battery 110 is converted from the output voltage value VB of the battery 110 to the first voltage value V1 by means of the first power converter 120, while during the second period, the second load is in an off-state and the third load L3 is an on-state, and the output voltage value VB of the battery 110 is converted to the first voltage value V1 by means of the second power converter 130 during this period, wherein the second power converter 130 can output a power having a power value which is smaller than a power value of a power which can be output by the first power converter 120.

In this case, a maximum output power value of the second power converter 130 may be preferably e.g. smaller than a maximum output power value of the first power converter 120. Furthermore, a rated current value of the second power converter may be smaller than a rated current value of the first power converter 120. In this case, the maximum output power value and/or the rated current value of the first power converter 120 may be preferably configured to be selected based on a power consumption value during the first period, and the maximum output power value and/or the rated current value of the second power converter 130 may be preferably configured to be selected based on a power consumption value during the second period. For example, the maximum output power value and/or the rated current value of the first power converter 120 may be preferably configured to be selected so as to increase a conversion efficiency for supplying a power with the power consumption value during the first period, and the maximum output power value and/or the rated current value of the second power converter 130 may be preferably selected so as to increase a conversion efficiency for supplying a power with the power consumption value during the second period.

As described above, according to the present embodiment, the battery 110 for supplying a power to the first load L1 is also used to supply a power to the second load L2 and the third load L3, which have different driving voltages from the first load L1. In this manner, the present embodiment eliminates the needs for an additional battery for supplying a power with a driving voltage of the second load L2 and/or the third load L3 while it is possible to use the battery 110 to supply a power to the second load L2 and/or third load L3 in addition to the first load L1. This means that the present embodiment enables two types of loads having different driving voltages to be driven by means of a configuration having low costs and weight.

Furthermore, according to the present embodiment, the first power converter 120 with high output power is used only during the first period with a high power consumption, wherein the second power converter 130 with a low output power is used during the second period with low power consumption. According to the present embodiment, the output power from the battery 110 can be thus used to supply a power to loads having a lower driving voltage value (the second load L2 and/or the third load L3) than the output voltage value VB from the battery 110 without reducing the conversion efficiency.

For example, the power supply apparatus 100 is intended for a vehicle (such as a Battery Electric Vehicle), wherein the first load L1 is e.g. a drive motor for the vehicle and the second load L2 and/or the third load L3 is e.g. an ECU for the vehicle. Particularly, the second load L2 is configured to be in an on-state when the ignition switch of the vehicle is in an on-state, wherein the second load L2 is configured to be in an off-state when the ignition switch of the vehicle is in an off-state. The third load L3 is configured to be always in an on-state regardless of a state of the ignition switch of the vehicle. Namely, during the first period, the ignition switch is in an on-state, wherein during the second period, the ignition switch is in an off-state.

In this case, the controller 140 includes a means for checking the state of the ignition switch. Furthermore, when the ignition switch is switched from the off-state to the on-state, the controller 140 controls the second power converter 130 to be off and controls first power converter 120 to be on, wherein when the ignition switch is switched from the on-state to the off-state, the controller 140 controls the first power converter 120 to be off and controls second power converter 130 to be on.

In this manner, it is possible to supply the power consumed during the off-state of the ignition switch of the vehicle (so-called dark current) from the battery 110 without reducing the conversion efficiency.

Figure 2:
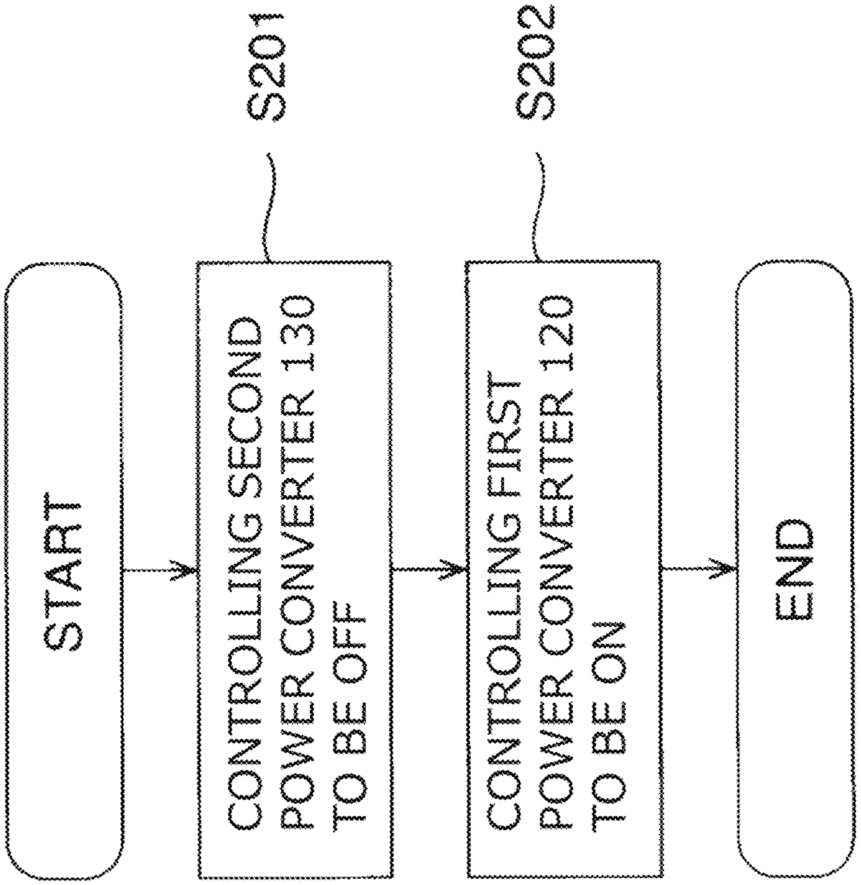
FIG. 2 shows exemplar processes carried out in a controller 140 of the power supply apparatus 100 according to the present embodiment when a switching process occurs from a second period to a first period (when an ignition switch of a vehicle is switched from an off-state to an on-state)

FIG. 2 shows exemplar processes carried out in a controller 140 of the power supply apparatus 100 according to the present embodiment when a switching process occurs from a second period to a first period (when an ignition switch of a vehicle is switched from an off-state to an on-state). The controller 140 controls the second power converter 130 to be off (step S201). The controller 140 controls the first power converter 120 to be on (step S202).

Figure 3:
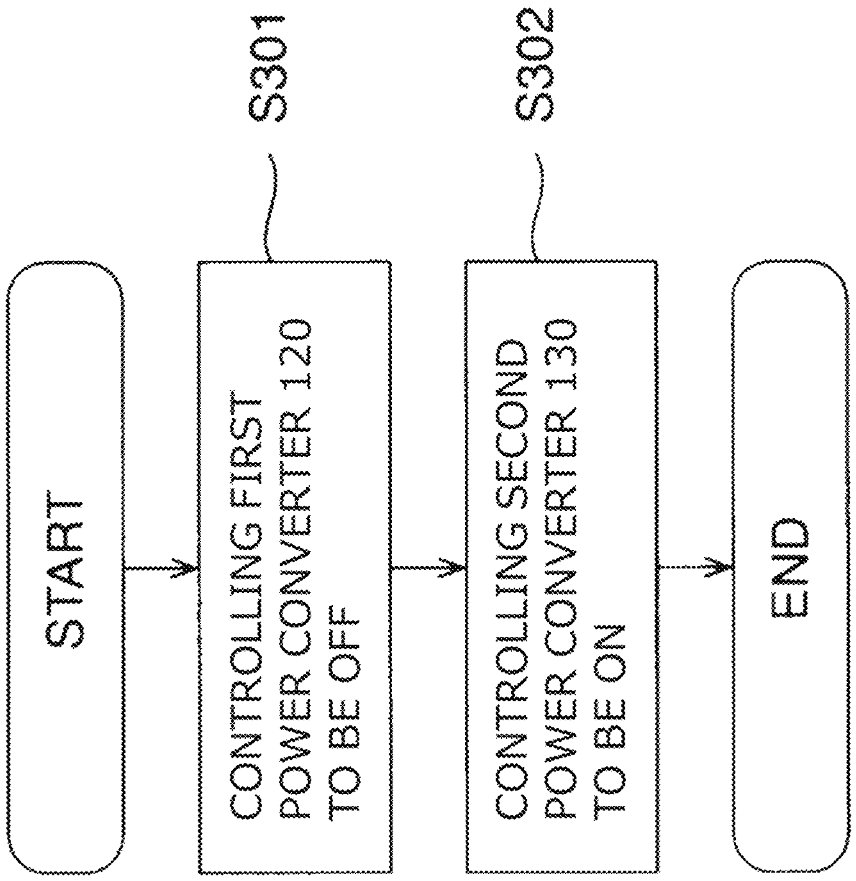
FIG. 3 shows exemplar processes carried out in the controller 140 of the power supply apparatus 100 according to the present embodiment when a switching process occurs from the first period to the second period (when the ignition switch of the vehicle is switched from the on-state to the off-state)

FIG. 3 shows exemplar processes carried out in the controller 140 of the power supply apparatus 100 according to the present embodiment when a switching process occurs from the first period to the second period (when the ignition switch of the vehicle is switched from the on-state to the off-state). The controller 140 controls the first power converter 120 to be off (step S301). The controller 140 controls the second power converter 130 to be on (step S302).

Third Power Converter 150

The control section 121 of the first power converter 120 includes a power input terminal CP1 for receiving a supplied power, and the control section 131 of the second power converter 130 includes a power input terminal CP2 for receiving a supplied power, wherein the controller 140 includes a power input terminal CP3 for receiving supplied power. The power input terminal CP1 of the control section 121 of the first power converter 120, the power input terminal CP2 of the control section 131 of the second power converter 130, and/or the power input terminal CP3 of the controller 140 may be preferably connected to the second power supply line PL2, as shown in FIG. 1. In this manner, it is possible to supply a power to the control section 121 of the first power converter 120, the control section 131 of the second power converter 130, and/or the controller 140 via the second power supply line PL2, wherein a power with a voltage value lower than the output voltage value of the battery 110 can be then supplied to the to the control section 121 of the first power converter 120, the control section 131 of the second power converter 130, and/or the controller 140.

When switching from the off-state to the on-state of the first power converter 120 and/or the second power converter 130, supply of power to the second power supply line PL2 from the first power converter 120 and/or second power converter 130 may be initiated at a time which is delayed from the time at which the switching process from the off-state to the on-state has occurred in the power converter(s). This means that when switching from the off-state to the on-state of the first power converter 120 and/or the second power converter 130, a moment may exist at which no power is supplied to the second power supply line PL2 from any of the first power converter 120 and the second power converter 130. If a moment exists at which no supply of a power to the second power supply line PL2 occurs, this means that there is no supply of a power to a load(s) (the second load L2, the third load L3, the control section 121 of the first power converter 120, the control section 131 of the second power converter 130, and the controller 140) at the moment. Furthermore, the switching process from the off-state to the on-state of the first power converter 120 and/or second power converter 130 possibly may not be performed correctly at the moment due to the fact that no power is supplied to the control section 121 of the first power converter 120, the control section 131 of the second power converter 130, and/or the controller 140 at this moment.

Figure 4:
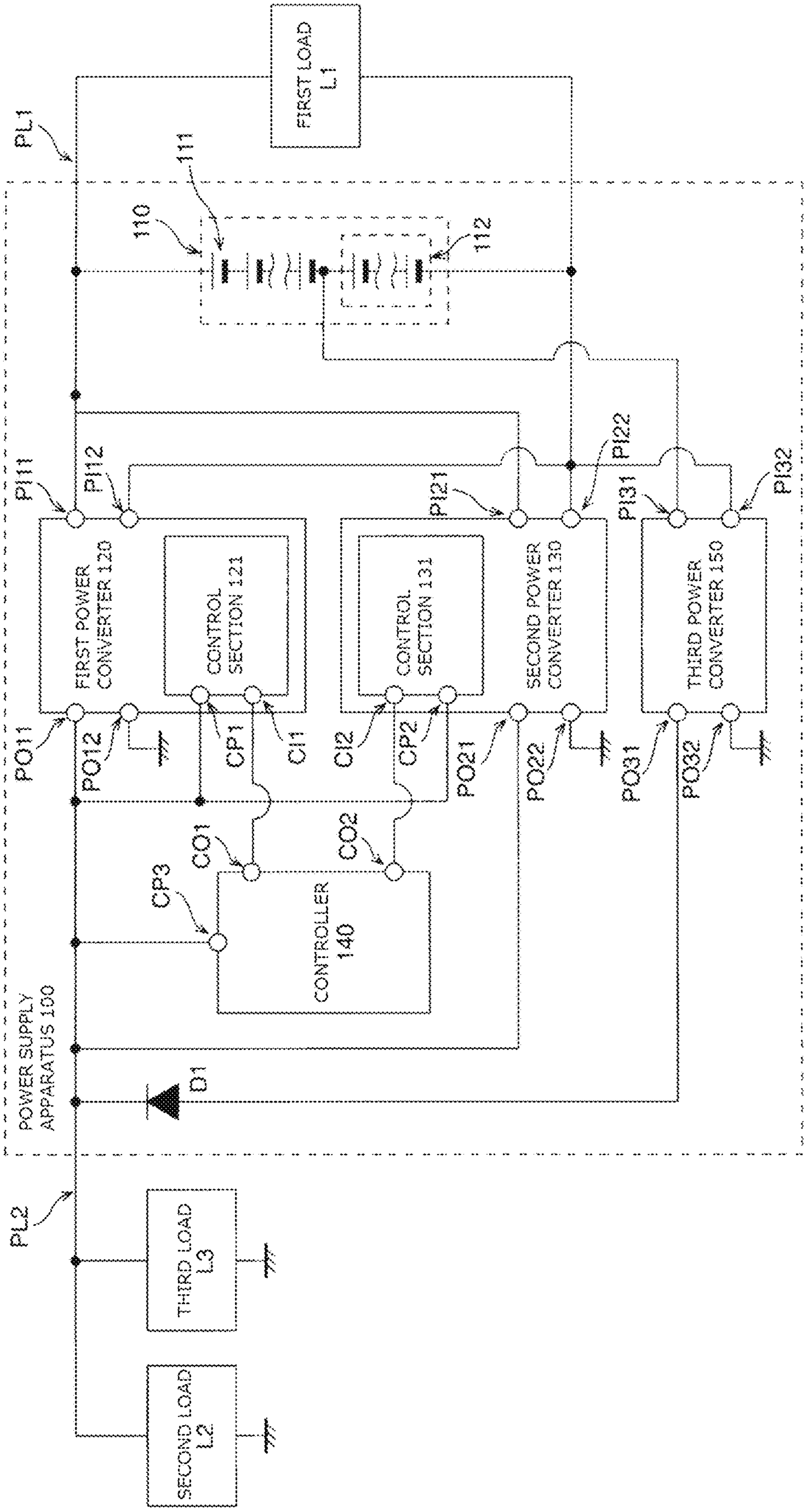
FIG. 4 shows another exemplar power supply apparatus 100.

Therefore, the power supply apparatus 100 may further include a third power converter 150 as shown in FIG. 4. The third power converter 150 converts the output power from the battery 110 into the power with the second voltage value V2 (for example 10V) and supplies the power with the second voltage value V2 to the second power supply line PL2. This means that the third power converter 150 converts the output power from the battery 110 to the second voltage value V2 and then supplies the converted output power to the second power supply line PL2. For example, the third power converter 150 is configured to be always in the on-state.

For example, the third power converter 150 is configured as a DC/DC converter (e.g. isolated DC/DC converter) and includes a first power input terminal PI31, a second power input terminal PI32, a first power output terminal PO31, and a second power output terminal PO32.

The first power input terminal PI31 may be connected to a positive electrode of the battery 110, and the second power input terminal PI32 may be connected to a negative electrode of the battery 110. Alternatively, the first power input terminal PI31 may be connected to a positive electrode of a sub-battery 112 as shown in FIG. 4 (in the example as shown in FIG. 4, a battery formed by some of cells 111 of the battery 110 which are located on the negative electrode side of the battery 110), and the second power input terminal PI32 may be connected to a negative electrode of the sub-battery 112, wherein the sub-battery 112 is formed by some of cells 111 of the battery 110. In the case where the first power input terminal PI31 and the second power input terminal PI32 are connected to the positive electrode and the negative electrode of the battery 110 respectively, the third power converter 150 receives a power with the output voltage value VB of the battery 110 through the first power input terminal PI31 and the second power input terminal PI32. In the case where the first power input terminal PI31 and the second power input terminal PI32 are connected to the positive electrode and the negative electrode of the sub-battery 112 respectively, the third power converter 150 receives a power with an output voltage value VSB of the sub-battery 112 (<VB) through the first power input terminal PI31 and the second power input terminal PI32.

The third power converter 150 outputs power with the second voltage value V2 through the first power output terminal PO31 and the second power output terminal PO32. In the example shown in FIG. 4, the first power output terminal PO31 is connected to the second power supply line PL2, and the second power output terminal PO32 is grounded. A power output from the third power converter 150 is supplied to the loads connected to the second power supply line PL2.

In this manner, power will be supplied to the second power supply line PL2 from the third power converter 150 and it will be possible to always supply power to the loads connected to the second power supply line PL (the second load L2, the third load L3, the control section 121 of the first power converter 120, the control section 131 of the second power converter 130, and the controller 140) even if a period exists in which no power is supplied to the second power supply line PL2 from the first power converter 120 or the second power converter 130.

In this case, the second voltage value V2 may be preferably lower than the first voltage value V1, the first power output terminal PO31 of the third power converter 150 may be preferably connected to the second power supply line PL2 via the first diode D1 so that a forward direction of the first diode D1 is oriented from the first power output terminal PO31 of the third power converter 150 toward the second power supply line PL2.

In this manner, power will be supplied to the second power supply line PL2 from the third power converter 150 only during a period in which no power is supplied from the first power converter 120 or the second power converter 130, while no power is supplied from the third power converter 150 to the second power supply line PL2 when power is supplied to the second power supply line PL2 from the first power converter 120 or the second power converter 130. As a consequence, even if the third power converter 150 is always kept in an on-state, power supply to the second power supply line PL2 from third power converter 150 occurs only when this is necessary.

Controller 140

Figure 5:
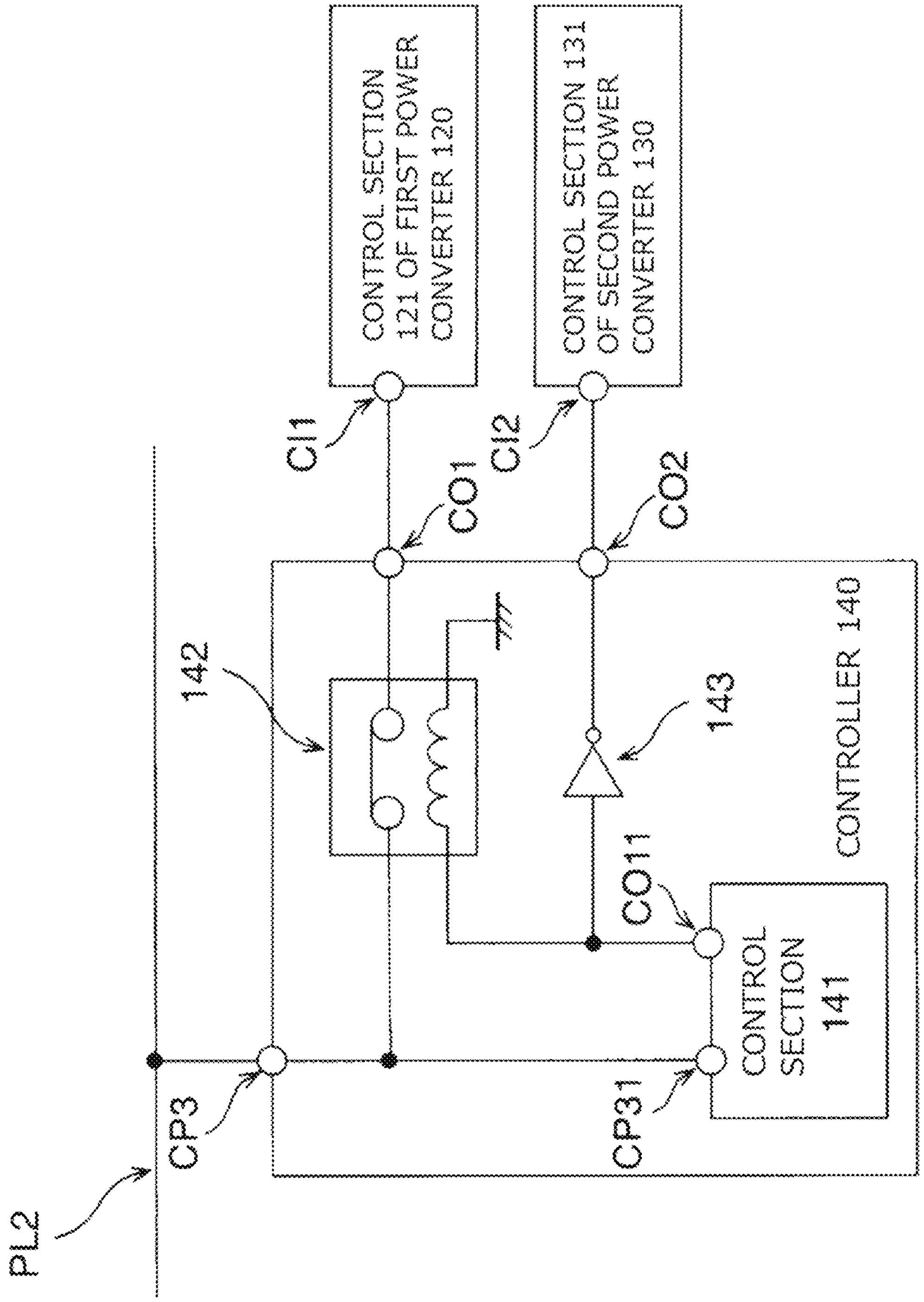
FIG. 5 shows an exemplar controller 140.

The controller 140 may be formed by a computer, or may include a control section 141 formed by a computer, a mechanical relay 142, and a NOT-circuit 143, as shown in FIG. 5.

The control section 141 includes a power input terminal CP31 and a control signal output terminal CO11. The power input terminal CP31 is connected to the second power supply line PL2, and the control section 141 receives a power supplied from the second power supply line PL2. The control section 141 outputs a control signal through the control signal output terminal CO11.

A switch of the mechanical relay 142 is connected between the second power supply line PL2 and the control signal input terminal CI1 of the control section 121 of the first power converter 120. A coil of the mechanical relay 142 is connected between the control signal output terminal CO11 of the control section 141 and ground. An input terminal of the NOT-circuit 143 is connected to the control signal output terminal CO11 of the control section 141, wherein an output terminal of the NOT-circuit 143 is connected to the control signal input terminal CI2 of the control section 131 of the second power converter 130.

Thus, when the control section 141 outputs a high-level signal through the control signal output terminal CO11, the switch of the mechanical relay 142 is switched on, wherein the first control signal output terminal CO1 of the controller 140 is then conductively connected to the second power supply line PL2. At this time, the high-level signal is provided to the input terminal of the NOT-circuit 143, and a low-level signal is then output from the output terminal of the NOT-circuit 143. As a consequence, when the control section 141 outputs a high-level signal through the control signal output terminal CO11, the high-level signal (signal with the first voltage value V1 or the second voltage value V2) is provided to the control signal input terminal CI1 of the control section 121 of the first power converter 120, wherein the low-level signal is then provided to the control signal input terminal CI2 of the control section 121 of the second power converter 130.

On the other hand, when the control section 141 outputs a low-level signal (signal of 0V) through the control signal output terminal CO11, the switch of the mechanical relay 142 is switched off, wherein the control signal input terminal CI1 of the control section 121 of the first power converter 120 is then isolated from the second power supply line PL2. At this time, the low-level signal is provided to the input terminal of the NOT-circuit 143, and a high-level signal is then output from the output terminal of the NOT-circuit 143. As a consequence, when the control section 141 outputs a low-level signal (signal of 0V) through the control signal output terminal CO11, the low-level signal (signal of 0V) is provided to the control signal input terminal CI1 of the control section 121 of the first power converter 120, wherein the high-level signal is then provided to the control signal input terminal CI2 of the control section 121 of the second power converter 130.

Therefore, the control section 141 may preferably output a high-level signal through the control signal output terminal CO11 during the first period and output a low-level signal (0V signal) through the control signal output terminal CO11 during a period other than the first period. In this case, the control section 121 of the first power converter 120 may be preferably configured to control the first power converter 120 to be on when a high-level signal is provided to the control signal input terminal CI1, and to control the first power converter 120 to be off when a low-level signal is provided to the control signal input terminal CI1, wherein the control section 131 of the second power converter 130 may be preferably configured to control the second power converter 130 to be on when the high-level signal is provided to the control signal input terminal CI2, and to control the second power converter 130 to be off when the low-level signal is provided to the control signal input terminal CI2.

In this manner, the controller 140 can control the first power converter 120 to be on and control the second power converter 130 to be off during the first period, wherein the controller 140 can control the first power converter 120 to be off and control the second power converter 130 to be on during the second period (period other than the first period).

The control section 141 may also preferably output the low-level signal (signal of 0V) through the control signal output terminal CO11 during the first period and output the high-level signal through the control signal output terminal CO11 during the period other than the first period. In this case, the control section 121 of the first power converter 120 may be preferably configured to control the first power converter 120 to be on when the low-level signal is provided to the control signal input terminal CI1, and to control the first power converter 120 to be off when the high-level signal is provided to the control signal input terminal CI1, wherein the control section 131 of the second power converter 130 may be preferably configured to control the second power converter 130 to be on when the low-level signal is provided to the control signal input terminal CI2, and to control the second power converter 130 to be off when the high-level signal is provided to the control signal input terminal CI2.

Similarly, in this manner, the controller 140 can control the first power converter 120 to be on and control the second power converter 130 to be off during the first period, wherein the controller 140 can control the first power converter 120 to be off and control the second power converter 130 to be on during the second period (period other than the first period).

The present invention has been described above by means of the preferable embodiment thereof. Although the invention has been described herein by presenting a specific example, various modifications and changes may be made to such an example without departing from the spirit and scope of the invention as set forth in the claims.

REFERENCE SIGNS LIST

100 Power supply apparatus
110 Battery
111 Cells
112 Sub-battery
120 First power converter
121 Control section
130 Second power converter
131 Control section
140 Controller
141 Control section
142 Mechanical relay
143 NOT-circuit

What is claimed is:

1. A power supply apparatus comprising:
- a battery configured to supply a power to a first power supply line;
- a first power converter configured to convert an output power from the battery into a power with a first voltage value and to supply the power with the first voltage value to a second power supply line;
- a second power converter configured to convert an output power from the battery into a power with the first voltage value and to supply the power with the first voltage value to the second power supply line; and
- a controller configured to control the first power converter and the second power converter,
- wherein the controller configured to:
  - control the first power converter to be on and control the second power converter to be off during a first period; and
  - control the first power converter to be off and control the second power converter to be on during a period other than the first period.

2. The power supply apparatus according to claim 1,
- wherein the second power supply line is connected to a second load and a third load,
- wherein the second load is configured to:
  - be caused to be on during the first period; and
  - be caused to be off during the period other than the first period,
- wherein the third load is configured to be caused to be always on.

3. The power supply apparatus according to claim 2,
- wherein the second power converter can output a power having a power value,
- wherein the power value is smaller than a power value of a power which can be output by the first power converter.

4. The power supply apparatus according to claim 3, further comprising:
- a third power converter configured to convert an output power from the battery into a power with a second voltage value and to output the power with the second voltage value to the second power supply line.

5. The power supply apparatus according to claim 4, further comprising:
- a first diode connected between the second power supply line and the third power converter,
- wherein the second voltage value is lower than the first voltage value, and
- wherein the first diode has a forward direction which is oriented from the third power converter toward the second power supply line.

6. The power supply apparatus according to claim 5,
- wherein the first power converter includes a control section configured to control operation of the first power converter,
- wherein the control section of the first power converter includes a power input terminal for receiving a supplied power,
- wherein the second power converter includes a control section configured to control operation of the second power converter, wherein the control section of the second power converter includes a power input terminal for receiving a supplied power, wherein the controller includes a power input terminal for receiving a supplied power, and wherein the power input terminal of the control section of the first power converter, the power input terminal of the control section of the second power converter, and the power input terminal of the controller are connected to the second power supply line.

7. The power supply apparatus according to claim 5, wherein the battery includes a plurality of cells, wherein the third power converter is configured to convert an output power from the sub-battery into a power with the second voltage value and to output the power with the second voltage value to the second power supply line, and wherein the sub-battery is formed by some of cells of the battery.

8. The power supply apparatus according to claim 3, wherein the first power converter includes a control section configured to control operation of the first power converter, wherein the control section of the first power converter includes a control signal input terminal for receiving a control signal, wherein the control section of the first power converter is configured to control the first power converter to be on/off based on the control signal received by the control signal input terminal of the control section of the first power converter, wherein the second power converter includes a control section configured to control operation of the second power converter, wherein the control section of the second power converter includes a control signal input terminal for receiving a control signal, and wherein the control section of the second power converter is configured to control the second power converter to be on/off based on the control signal received by the control signal input terminal of the control section of the second power converter.

9. The power supply apparatus according to claim 8, wherein the controller includes a control section, a mechanical relay and a NOT-circuit, wherein the control section of the controller includes a control signal output terminal for outputting a control signal, wherein a switch of the mechanical relay is connected between the second power supply line and the control signal input terminal of the control section of the first power converter, wherein a coil of the mechanical relay is connected between the control signal output terminal of the control section of the controller and ground, wherein an input terminal of the NOT-circuit is connected to the control signal output terminal of the control section of the controller, and wherein an output terminal of the NOT-circuit is connected to the control signal input terminal of the control section of the second power converter.

10. The power supply apparatus according to claim 1, wherein the power supply apparatus is configured as a power supply apparatus for a vehicle, wherein during the first period, an ignition switch of the vehicle is configured to be on, and wherein during the period other than the first period, the ignition switch of the vehicle is configured to be off.

* * * * *